US006232831B1

(12) United States Patent
Lennous et al.

(10) Patent No.: US 6,232,831 B1
(45) Date of Patent: May 15, 2001

(54) ELECTRICAL POWER SUPPLY WITH FLOATING CURRENT SOURCE SUITABLE FOR PROVIDING BIAS VOLTAGE AND CURRENT TO AN AMPLIFIED TRANSDUCER

(75) Inventors: Paul A. Lennous; Alvin G. Becker, both of Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/454,256

(22) Filed: Dec. 2, 1999

(51) Int. Cl.[7] .................................................. G05F 3/02
(52) U.S. Cl. ......................... 327/543; 327/538; 323/315
(58) Field of Search ................................... 327/538, 540, 327/543; 323/315

(56) References Cited

U.S. PATENT DOCUMENTS

| 4,325,019 | * | 4/1982 | Tezuka ................................ 323/315 |
| 4,445,054 | * | 4/1984 | Ishii .................................... 327/104 |
| 4,536,662 | * | 8/1985 | Fujii .................................... 323/315 |
| 4,792,704 | * | 12/1988 | Lobb et al. ........................ 327/333 |
| 5,463,353 | * | 10/1995 | Countryman et al. ............. 331/2 |
| 5,500,615 | * | 3/1996 | Barter ................................. 327/327 |
| 5,945,873 | * | 8/1999 | Antone et al. ..................... 327/541 |

OTHER PUBLICATIONS

Gray et al., *Analysis and Design of Analog Integrated Circuits, 2nd Ed.,* ©1977, 1984 by John Wiley & Sons, Inc., pp. 233–253.
Barrett, "Accelerometer Instalations," pp. 1–13, www.designinfo.com/wilcoxon/accelinstall.htm.
"Introduction to Signal condition for ICP®& Charge Piezoelectric Sensors," pp. 1–19, www.pcb.com/tech_signal.htm.
"Introduction to Piezoelectric Pressure Sensors," pp. 1–13, www.pcb.com/tech_pres.htm.

* cited by examiner

Primary Examiner—Terry D. Cunningham
(74) Attorney, Agent, or Firm—Conley, Rose & Tayon; Jeffrey C. Hood

(57) ABSTRACT

An electrical power supply is described which includes a floating current source. The floating current source includes a current source providing a selected amount of electrical current to a first terminal, and a current sink receiving the selected amount of electrical current from a second terminal. The current source is adapted for coupling to a first electrical voltage level which is positive with respect to a reference potential. The current sink is adapted for coupling to a second electrical voltage level which is negative with respect to the reference potential. The selected amount of current may be proportional to a reference current flowing through both the current source and the current sink. The current source and sink may each include a pair of transistors coupled together such that a flow of electrical current through one of the pair of transistors produces a proportional flow of electrical current through the other transistor. The electrical power supply may also include two line-powered voltage sources producing the first and second electrical voltage levels. During operation, the first and second electrical voltage levels may be adjusted by varying the first and second voltage sources, and a desired electrical voltage may be developed between the first and second terminals. The power supply is thus capable of supplying a bias voltage and current to an amplified transducer (e.g., an amplified piezoelectric transducer).

24 Claims, 5 Drawing Sheets

ELECTRICAL POWER SUPPLY WITH FLOATING CURRENT SOURCE SUITABLE FOR PROVIDING BIAS VOLTAGE AND CURRENT TO AN AMPLIFIED TRANSDUCER

BACKGROUND OF THE INVENTION

1. Field of the Invention

The present invention relates to electrical power supplies used to provide electrical power to amplified measurement transducers, and more particularly to an electrical power supply including a floating current source facilitating the use of line-powered circuits operating from a utility a.c. power source.

2. Description of the Related Art

Piezoelectric materials develop surface electrical charges when subjected to a mechanical force. When an applied force distorts or deforms a piezoelectric crystalline structure, electrical charges within the crystalline structure are displaced, and a net electrical charge is developed across opposed surfaces of the crystalline structure. In many cases, the developed electrical charge is directly proportional to the applied force. Piezoelectric materials include quartz, tourmaline, and man-made piezoelectric ceramic materials (e.g., lead zirconate titanate or PZT).

A piezoelectric transducer includes a piezoelectric material as a sensing element to measure, for example, force, pressure, or acceleration. The electrical signals produced by piezoelectric transducers are often conveyed to remote readout devices by multi-conductor cables. Modem piezoelectric transducers include electronic components which form an electrical interface between the piezoelectric transducers and the cables in order to reduce distortion of the electrical signals (e.g., amplitude reduction, noise pickup, etc.) during transmission along the cables.

FIG. 1 is a diagram of an exemplary prior art measurement system 10 including an acceleration transducer (i.e., accelerometer) 12, a power supply 14, and a readout unit 16. Accelerometer 12 produces an electrical signal proportional to an acceleration experienced by accelerometer 12. Accelerometer 12 may be mechanically coupled to a physical structure or unit under test (UUT) undergoing shock or vibration testing. The electrical signal produced by accelerometer 12 is transmitted to readout unit 16. Readout unit 16 may be, for example, an oscilloscope, a data recorder, or a chart recorder.

Accelerometer 12 includes a seismic mass 18, a piezoelectric sensing element 20, and a signal amplifier 22 enclosed within a housing 24. Piezoelectric sensing element 20 may be a piezoelectric crystalline material (e.g., quartz). Seismic mass 18 is mechanically coupled to piezoelectric sensing element 20 such that when accelerometer 12 experiences an acceleration, seismic mass 18 imposes a mechanical force upon sensing element 20 which distorts a crystalline structure of sensing element 20. For example, when accelerometer 12 experiences acceleration a along a defined axis extending through accelerometer 12, seismic mass 18 may impose a compression force F upon sensing element 20 where F=m·a. Alternately, seismic mass 18 may impose a tension force F within sensing element 20, or a shear stress within sensing element 20.

When accelerometer 12 experiences an acceleration, and seismic mass 18 imposes a mechanical force upon sensing element 20, sensing element 20 produces an electrical signal (e.g., a charge signal or a voltage signal) between an input terminal of signal amplifier 22 and a reference node 26. When sensing element 20 produces a charge signal, signal amplifier 22 may be a charge amplifier which converts the charge signal to a voltage signal. Signal amplifier 22 produces a voltage signal $V_S$ at an output terminal, where a known relationship exists between voltage signal $V_S$ and the electrical signal produced by sensing element 20.

In the embodiment of FIG. 1, voltage signal $V_S$ is transmitted along a first two-conductor cable 28 to power supply 14, and along a second two-conductor cable 30 to an input of readout unit 16. A signal loop is thus formed between accelerometer 12 and readout unit 16. Signal amplifier 22 preferably has a relatively low output impedance in order that other impedances around the signal loop may be kept relatively low. For example, when the output impedance of signal amplifier 22 is reduced, an input impedance of a differential amplifier 32 within readout unit 16 which receives voltage signal $V_S$ may also be reduced. As a result, the amount of noise introduced into voltage signal $V_S$ during transmission from accelerometer 12 to readout unit 16 is reduced. It is noted that power supply 14 may be incorporated into readout unit 16, thus eliminating the second two-conductor cable 30.

Power supply 14 produces a direct current (d.c.) bias voltage $V_B$ and bias current $I_B$ required by signal amplifier 22. Power supply 14 includes a battery 34 and a constant current diode 36 connected in series between the two conductors of the first two-conductor cable 28. Such power supplies for amplified transducers are well known in the art. Battery 34 produces a d.c. voltage, and constant current diode 36 passes constant d.c. current $I_b$. As shown in FIG. 1, positive bias voltage $V_B$ is developed between the output terminal of signal amplifier 22 and reference node 26, and bias current $I_B$ flows into the output terminal of signal amplifier 22. Signal voltage $V_S$ produced by signal amplifier 22 is superimposed upon bias voltage $V_B$ such that an electrical voltage of $(V_B+V_S)$ exists between the output terminal of signal amplifier 22 and reference node 26. A d.c. blocking capacitor may be inserted in the signal loop between power supply 14 and readout unit 16, or readout unit 16 may include a d.c. level shifter to remove bias voltage $V_B$.

FIG. 2 is a diagram of one embodiment of signal amplifier 22 according to the prior art. In the embodiment of FIG. 2, signal amplifier 22 includes an n-channel, depletion-mode metal oxide semiconductor (MOS) transistor 40 having a gate terminal G coupled to a first terminal of sensing element 20, a source terminal S coupled to a second terminal of sensing element 20 and reference node 26, and a drain terminal D coupled to the output terminal of signal amplifier 22. MOS transistor 40 is biased into a linear operating region by bias voltage $V_B$ and bias current $I_B$ provided by power supply 14. Connected in a common source configuration as shown in FIG. 2, MOS transistor 40 has a relatively high input impedance, a relatively low output impedance, and amplifies the voltage produced by sensing element 20. Signal voltage $V_S$ produced by MOS transistor 40 reproduces the electrical signal produced by sensing element 20, and is superimposed upon bias voltage $V_B$ such that an electrical voltage of $(V_B+V_S)$ exists between the output terminal of signal amplifier 22 and reference node 26.

FIG. 3 is a graph of the voltage between the output terminal of signal amplifier 22 and reference node 26 versus time. The linear operating region of MOS transistor 40 exists between a maximum voltage $V_{MAX}$ and a minimum voltage $V_{MIN}$. Bias voltage $V_B$ may be about midway between $V_{MAX}$ and a minimum voltage $V_{MIN}$ as shown in FIG. 3, allowing for equally-sized positive and negative voltage swings of signal voltage $V_S$. An electrical voltage of $(V_B+V_S)$ exists between the output terminal of signal amplifier 22 and reference node 26 as described above and shown in FIG. 3.

One reason batteries are often used to generate bias voltage $V_B$ and bias current $I_b$ is to ensure electrical isolation between the two conductors of two-conductor cable 28 and a ground electrical potential G2 existing at power supply 14. Referring back to FIG. 1, housing 24 of accelerometer 12 may be made of metal (e.g., stainless steel) for strength, durability, and long-term transducer reliability as is typical. In this case, metal housing 24 is also electrically conductive. When accelerometer 12 is mechanically coupled to an electrically conductive structure under test, and the electrically conductive structure is connected to a ground electrical potential G1 at the location of the structure (e.g., for safety reasons), housing 24 is also at ground electrical potential G1. As shown in FIG. 1, accelerometer 12 may include an internal electrical connection 38 which electrically connects reference node 26 to housing 24.

Power supply 14 may be some distance (e.g., hundreds or even thousands of feet) away from accelerometer 12, and ground electrical potential G2 may not be equal to ground electrical potential G1. In this case, a voltage $V_{G12}$ exists between ground potential G1 and ground potential G2 as shown in FIG. 1. If a negative terminal of battery 34 is connected to electrical potential G2, unwanted voltage $V_{G12}$ is introduced into the signal loop, and an input voltage $V_{IN}$ at the input of differential amplifier 32 includes voltage $V_{G12}$ in addition to signal voltage $V_S$. Voltage $V_{G12}$ represents an unwanted "ground loop" noise voltage, and serves to reduce the signal-to-noise ratio at the input of differential amplifier 32.

On the other hand, battery power supplies are undesirable as they have limited capacities, and their delivered electrical voltages decrease with time. Delivered electrical voltages often decrease very rapidly as batteries near an expended or discharged state, often without warning. For example, as battery 34 within power supply 14 nears an expended or discharged state, bias voltage $V_B$ provided by battery 34 decreases and approaches minimum voltage $V_{MIN}$ of the linear operating region of MOS transistor 40. As a result, the recording of negative excursions of voltage signal $V_S$ by readout unit 16 may be jeopardized.

Electrical equipment items which derive electrical operating power from an available utility alternating current (a.c.) electrical power source (e.g., a nearby electrical receptacle) are termed "line-powered" equipment items. Most line-powered voltage and current sources which might be deployed at the location of power supply 14 require at least one connection to a stable reference electrical potential—ground electrical potential G2. As a result of this connection, voltage $V_{G12}$ may easily be introduced into the signal loop as described above. Known techniques for reducing the amount of ground loop noise introduced into the signal loop at power supply 14 due to $V_{G12}$ include inductive coupling through transformer windings and optical coupling through optical couplers. Circuits based upon these techniques tend to be complex and difficult to design and build. They also tend to include relatively large numbers of components, and tend to be relatively bulky and expensive. It would thus be desirable to have a relatively simple, small, and inexpensive floating current power supply suitable for providing electrical power to an amplified piezoelectric transducer.

SUMMARY OF THE INVENTION

An electrical power supply is described which includes a floating current source. The floating current source includes a current source providing a selected amount of electrical current to a first terminal, and a current sink receiving the selected amount of electrical current from a second terminal. The current source is adapted for coupling to a first electrical voltage level which is positive with respect to a reference potential. The current sink is adapted for coupling to a second electrical voltage level which is negative with respect to the reference potential. The current source may be coupled to the current sink, and a reference current may flow through both the current source and the current sink in order to establish the selected amount of electrical current. The selected amount of current may be proportional to the reference current.

The current source may include a pair of semiconductor transistors (e.g., pnp bipolar junction transistors or BJTs, p-type metal oxide semiconductor or pMOS transistors, etc.) coupled together such that a flow of electrical current through one of the pair of transistors produces a proportional flow of electrical current through the other transistor. A collector terminal (BJT) or drain terminal (pMOS) of a first of the pair of transistors may be connected to the first terminal, and the reference current flowing through the second transistor may cause the first transistor to provide the selected amount of electrical current to the first terminal.

The current sink may include a pair of semiconductor transistors (e.g., npn BJTs, n-type metal oxide semiconductor or NMOS transistors, etc.) coupled together such that a flow of electrical current through one of the pair of transistors produces a proportional flow of electrical current through the other transistor. A collector terminal (BJT) or drain terminal (nMOS) of a first of the pair of transistors may be connected to the second terminal, and the reference current flowing through the second transistor may cause the first transistor to receive the selected amount of electrical current from the second terminal.

A collector terminal (BJT) or drain terminal (pMOS) of the second transistor of the current source may be coupled to a collector terminal (BJT) or drain terminal (nMOS) of the second transistor of the current sink such that the reference current flows through both the second transistor of the current source and the second transistor of the current sink. A current regulating element (e.g., a constant current diode) may be coupled between the collector terminal (BJT) or drain terminal (pMOS) of the second transistor of the current source and the collector terminal (BJT) or drain terminal (nMOS) of the second transistor of the current sink. The current regulating element may allow the reference current to pass therethrough.

In addition to the floating current source, the electrical power supply may include a first voltage source which produces the first electrical voltage level and a second voltage source which produces the second electrical voltage level. The first and second voltage sources may operate from a utility a.c. power source, and may be variable. During operation, the first and second electrical voltage levels may be adjusted by varying the first and second voltage sources, and a desired electrical voltage may be developed between the first and second terminals. The power supply is thus capable of supplying a bias voltage and current to an amplified transducer (e.g., an amplified piezoelectric transducer).

An instrumentation system is also described which includes a signal conditioning subsystem coupled between a transducer and a computer. The signal conditioning subsystem may include the electrical power supply described above. The transducer may produce measurement data and provide the measurement data to the signal conditioning subsystem. The signal conditioning subsystem may condition the measurement signal (e.g., amplify, filter, perform direct current level shifting, etc.) and provide the conditioned measurement signal to the computer. The computer may receive and store the conditioned measurement data. The transducer may include an signal amplifier requiring an electrical bias voltage and an electrical bias current. The signal conditioning subsystem may use the electrical power supply to provide a bias voltage and current required by the transducer.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Electrical Power Supply

Figure 1:
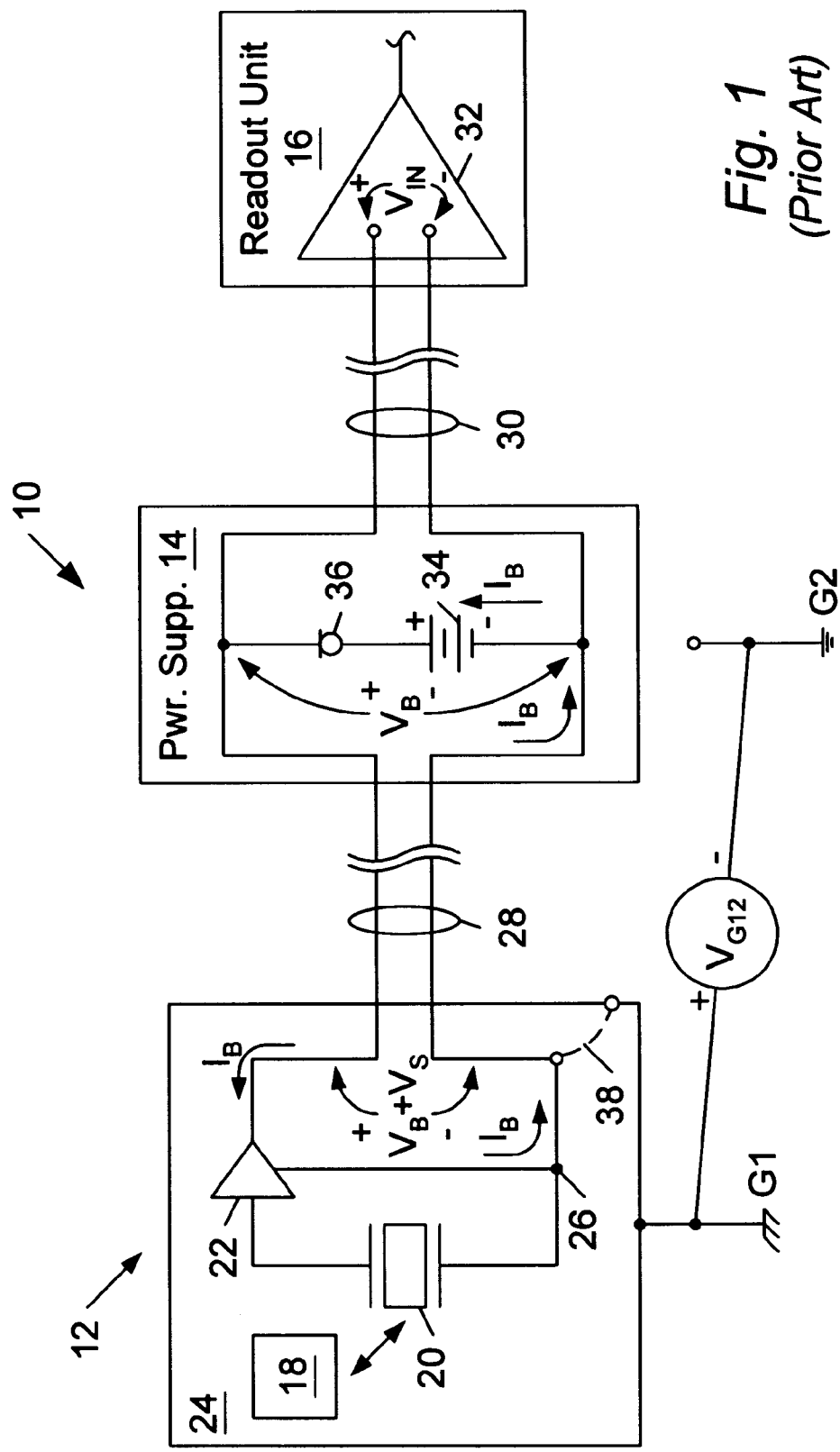
FIG. 1 is a diagram of an exemplary measurement system including an acceleration transducer (i.e., accelerometer), a power supply, and a readout unit, wherein the accelerometer includes a signal amplifier.
Figure 2:
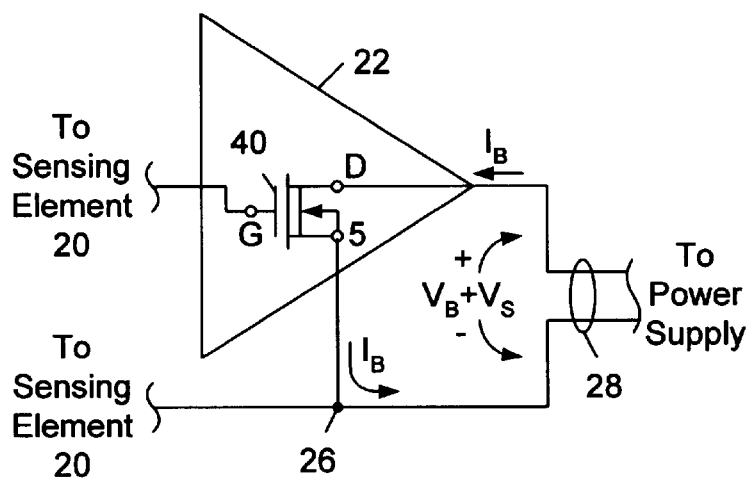
FIG. 2 is a diagram of one embodiment of the signal amplifier of FIG. 1.
Figure 3:
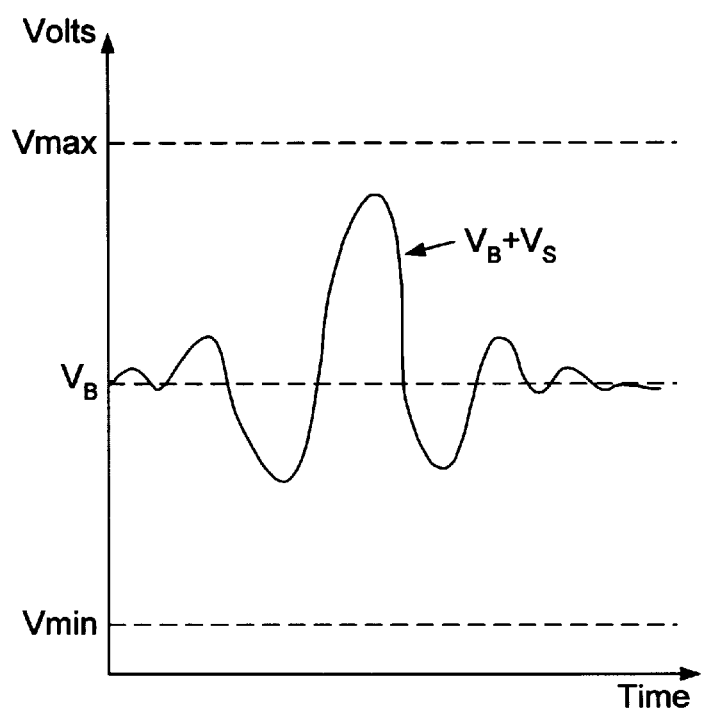
FIG. 3 is a graph of the voltage between an output terminal of the signal amplifier and a reference node within the accelerometer versus time.
Figure 4:
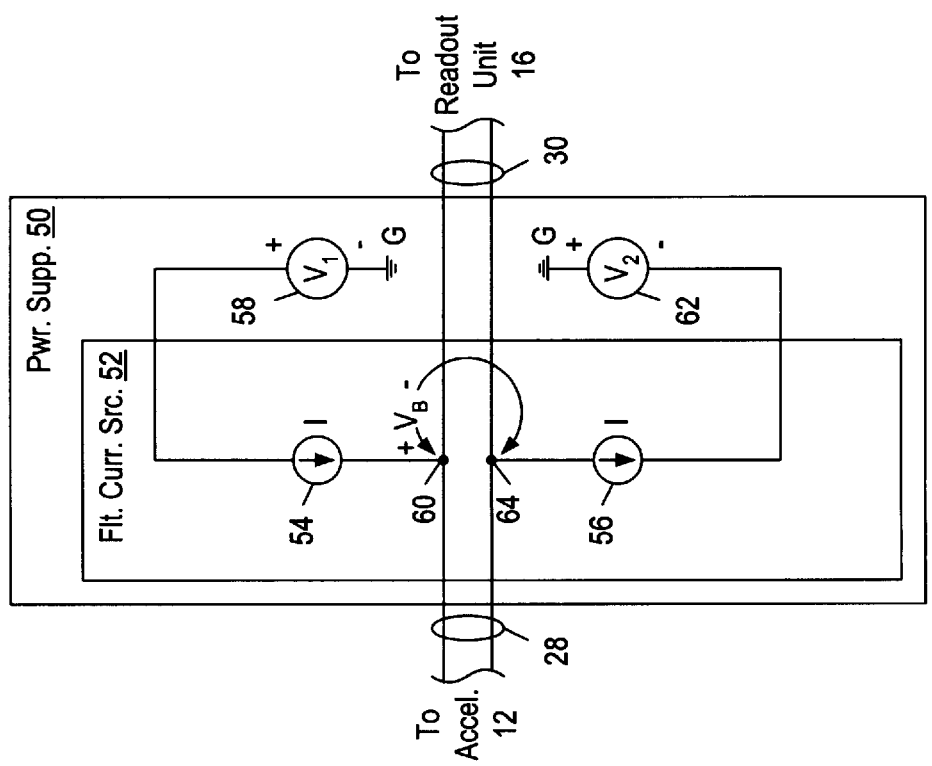
FIG. 4 is a diagram of an electrical power supply in accordance with the present invention, wherein the electrical power supply includes floating current source, and wherein the floating current source includes a current source and a current sink.

FIG. 4 is a diagram of an electrical power supply 50 in accordance with the present invention. Power supply 50 includes a floating current source 52. Floating current source 52 includes a current source 54 and a current sink 56. Current source 54 receives an electrical voltage $V_1$ produced by a first voltage source 58, where voltage $V_1$ is positive with respect to a reference potential G. Reference potential G may be, for example, the ground reference potential existing at the location of power supply 50. Current source 54 provides a constant flow of electrical current having a desired magnitude (e.g., bias current $I_B$ required by piezoelectric accelerometer 12 in FIG. 1) to a first terminal 60. Current sink 56 receives an electrical voltage $V_2$ produced by a second voltage source 62, where voltage $V_2$ is negative with respect to reference potential G. Current sink 56 receives a constant flow of electrical current having the same desired magnitude as that produced by current source 54 (e.g., bias current $I_B$) at a second terminal 64.

First voltage source 58 and second voltage source 62 may operate from a utility a.c. power source (i.e., may be line-powered), and may also be variable. During operation of power supply 50, voltages $V_1$ and $V_2$ may be adjusted by varying respective voltage sources 58 and 62 such that a selected electrical voltage (e.g., bias voltage $V_B$ required by piezoelectric accelerometer 12 in FIG. 1) is produced between first terminal 60 and second terminal 64. Current source 54 couples one conductor of two-conductor cables 28 and 30 to the output of first voltage source 58, and current sink 56 couples the other conductor of two-conductor cables 28 and 30 to the output of second voltage source 62.

Figure 5A:
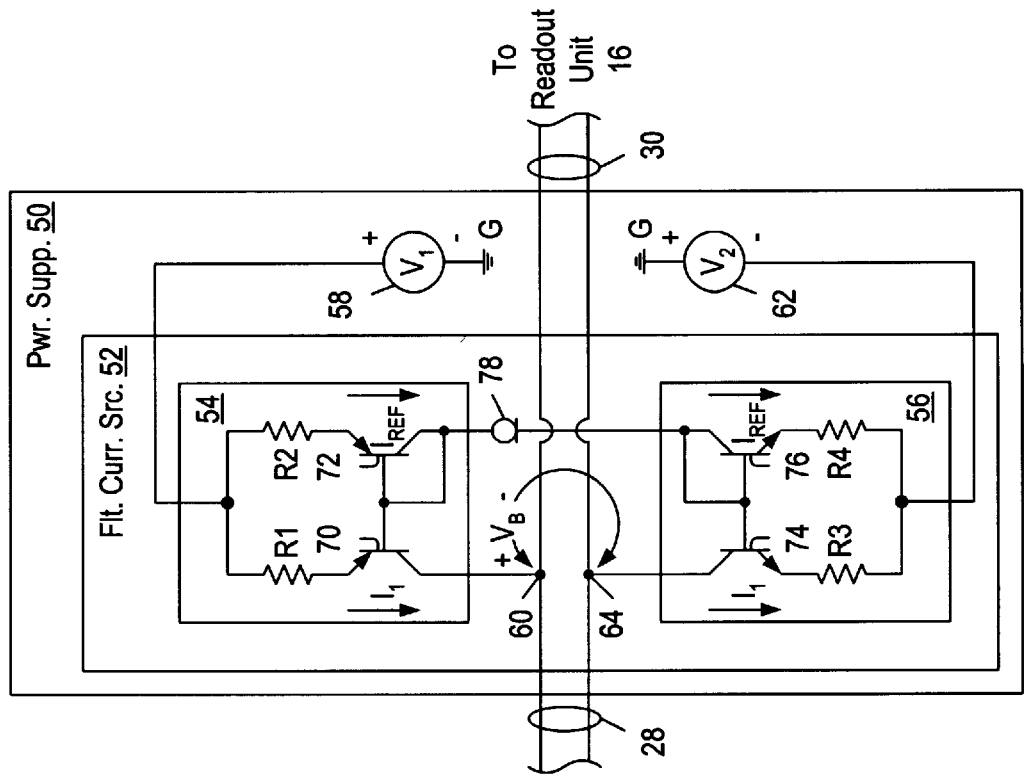
FIG. 5a is a diagram of one embodiment of the power supply of FIG. 4, wherein the current source includes a pair of pnp bipolar junction transistors (BJTs) coupled together such that a flow of electrical current through one of the pair of transistors produces a proportional flow of electrical current through the other transistor, and wherein the current sink includes a pair of npn BJTs coupled together such that a flow of electrical current through one of the pair of transistors produces a proportional flow of electrical current through the other transistor.

FIG. 5a is a diagram of one embodiment of power supply 50 of FIG. 4. In the embodiment of FIG. 5a, current source 54 includes a pair of pnp bipolar junction transistors (BJTs) 70 and 72 coupled together such that a flow of electrical current through one of the pair of transistors produces a proportional flow of electrical current through the other transistor. Similarly, current sink 56 includes a pair of npn BJTs 74 and 76 coupled together such that a flow of electrical current through one of the pair of transistors produces a proportional flow of electrical current through the other transistor. Current source 54 is coupled to current sink 56, and a reference current $I_{REF}$ flows through both current source 54 and current sink 56 such that current source 54 provides a constant flow of electrical current $I_1$ having a desired magnitude to first terminal 60, where $I_1$, is proportional to $I_{REF}$, and current sink 56 receives a constant flow of electrical current $I_1$ from second terminal 64.

Each BJT 70 and 72 has an emitter terminal, a base terminal, and a collector terminal. The collector terminal of BJT 70 is connected to first terminal 60. A resistor R1 is connected between the emitter terminal of BJT 70 and voltage $V_1$ produced by first voltage source 58. The base terminal of BJT 72 is connected to the base terminal of BJT 70. The base terminal of BJT 72 is also connected to the collector terminal of BJT 72 such that the electrical voltage between collector and base terminals of BJT 72 is zero. A resistor R2 is connected between the emitter terminal of BJT 72 and voltage $V_1$ produced by first voltage source 58. As the electrical voltages between the base and emitter terminals of BJTs 70 and 72 are approximately equal during operation, $I_1 \cdot R1 = I_{REF} \cdot R2$, or $I_1 = I_{REF}(R2/R1)$. Thus current $I_1$ flowing through BJT 70 and provided to first terminal 60 is proportional to reference current $I_{REF}$ flowing through BJT 72.

Each BJT 74 and 76 has an emitter terminal, a base terminal, and a collector terminal. The collector terminal of BJT 74 is connected to second terminal 64. A resistor R3 is connected between the emitter terminal of BJT 74 and voltage $V_2$ produced by second voltage source 62. The base terminal of BJT 76 is connected to the base terminal of BJT 74. The base terminal of BJT 76 is also connected to the collector terminal of BJT 76 such that the electrical voltage between collector and base terminals of BJT 76 is zero. A resistor R4 is connected between the emitter terminal of BJT 76 and voltage $V_2$ produced by second voltage source 62. As the electrical voltages between the base and emitter terminals of BJTs 74 and 76 are approximately equal during operation, $I_1 \cdot R3 = I_{REF} \cdot R4$, or $I_1 = I_{REF} \cdot (R4/R3)$, and electrical current $I_1$ received from terminal 64 and flowing through BJT 74 is proportional to reference current $I_{REF}$ flowing through BJT 76. As reference current $I_{REF}$ is common to current source 54 and current sink 56, it is noted that R1 may be made substantially equal to R3, and R2 may be made substantially equal to R4.

In the embodiment of FIG. 5a, a constant current diode 78 is connected between the collector terminal of BJT 72 and the collector terminal of BJT 76. Constant current diode 78 regulates reference current $I_{REF}$ flowing through BJTs 72 and 76 such that reference current $I_{REF}$ is substantially constant and has a magnitude dependent upon a desired value of electrical current $I_1$ produced by current source 54 and received by current sink 56 and the values of resistors R1, R2, R3, and R4. It is noted that constant current diode 78 may be replaced by one or more electrical components which establish the constant reference current $I_{REF}$ through BJTs 72 and 76.

Figure 5B:
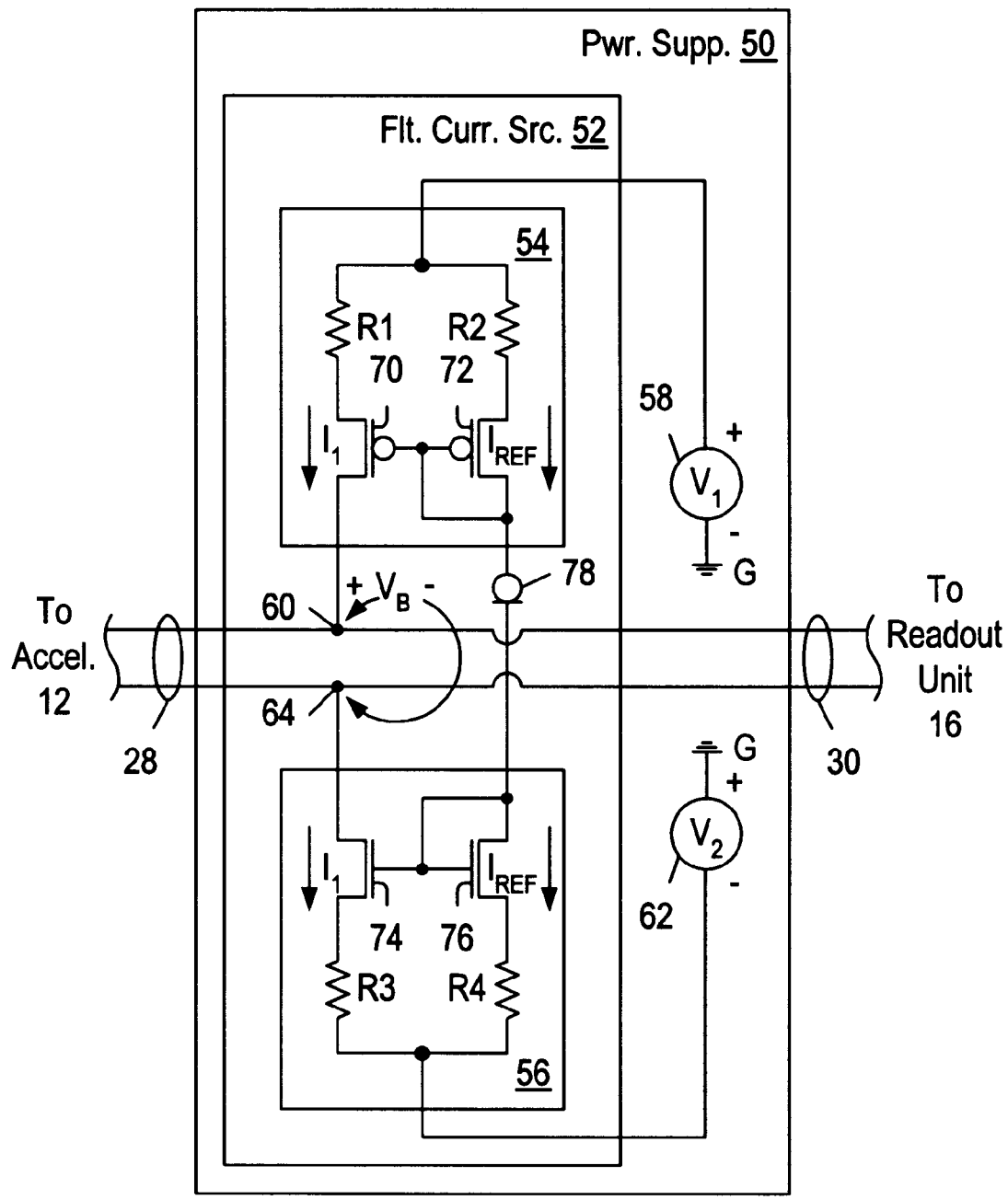
FIG. 5b is a diagram of an alternate embodiment of the power supply of FIG. 4, wherein the current source includes a pair of p-type metal oxide semiconductor (pMOS) transistors coupled together such that a flow of electrical current through one of the pair of transistors produces a proportional flow of electrical current through the other transistor, and wherein the current sink includes a pair of n-type metal oxide semiconductor (nMOS) transistors coupled together such that a flow of electrical current through one of the pair of transistors produces a proportional flow of electrical current through the other transistor.

FIG. 5b is a diagram of an alternate embodiment of power supply 50 of FIG. 4. In the embodiment of FIG. 5b, semiconductor transistors 70 and 72 are p-type metal oxide semiconductor (pMOS) transistors, and semiconductor transistors 74 and 76 are n-type metal oxide semiconductor (nMOS) transistors. As in FIG. 5a, current source 54 is coupled to current sink 56, and reference current $I_{REF}$ flows through both current source 54 and current sink 56 such that current source 54 provides a constant flow of electrical current $I_1$, having a desired magnitude to first terminal 60, where $I_1$ is proportional to $I_{REF}$, and current sink 56 receives a constant flow of electrical current $I_1$ from second terminal 64.

Each pMOS transistor 70 and 72 has a source terminal, a gate terminal, and a drain terminal. The drain terminal of pMOS transistor 70 is connected to first terminal 60. A resistor R1 is connected between the source terminal of pMOS transistor 70 and voltage $V_1$ produced by first voltage source 58. The gate terminal of pMOS transistor 72 is connected to the gate terminal of pMOS transistor 70. The gate terminal of pMOS transistor 72 is also connected to the drain terminal of pMOS transistor 72 such that the electrical voltage between drain and gate terminals of pMOS transistor 72 is zero. A resistor R2 is connected between the source terminal of pMOS transistor 72 and voltage $V_1$ produced by first voltage source 58. As the electrical voltages between the gate and source terminals of pMOS transistors 70 and 72 are approximately equal during operation, $I_1 \cdot R1 = I_{REF} \cdot R2$, or $I_1 = I_{REF} \cdot (R2/R1)$. Thus current $I_1$ flowing through pMOS transistor 70 and provided to first terminal 60 is proportional to reference current $I_{REF}$ flowing through pMOS transistor 72.

Each nMOS transistor 74 and 76 has a source terminal, a gate terminal, and a drain terminal. The drain terminal of nMOS transistor 74 is connected to second terminal 64. A resistor R3 is connected between the source terminal of nMOS transistor 74 and voltage $V_2$ produced by second voltage source 62. The gate terminal of nMOS transistor 76 is connected to the gate terminal of nMOS transistor 74. The gate terminal of nMOS transistor 76 is also connected to the drain terminal of nMOS transistor 76 such that the electrical voltage between drain and gate terminals of nMOS transistor 76 is zero. A resistor R4 is connected between the source terminal of nMOS transistor 76 and voltage $V_2$ produced by second voltage source 62. As the electrical voltages between the gate and source terminals of nMOS transistors 74 and 76 are approximately equal during operation, $I_1 \cdot R3 = I_{REF} \cdot R4$, or $I_1 = I_{REF} \cdot (R4/R3)$, and electrical current $I_1$, received from second terminal 64 and flowing through nMOS transistor 74 is proportional to reference current $I_{REF}$ flowing through nMOS transistor 76. As reference current $I_{REF}$ is common to current source 54 and current sink 56, it is noted that R1 may be made substantially equal to R3, and R2 may be made substantially equal to R4.

In the embodiment of FIG. 5b, constant current diode 78 regulates reference current $I_{REF}$ flowing through pMOS transistor 72 and nMOS transistor 76. Reference current $I_{FEF}$ is substantially constant and has a magnitude dependent upon a desired value of electrical current $I_1$ produced by current source 54 and received by current sink 56 and the values of resistors R1, R2, R3, and R4. As noted above, constant current diode 78 may be replaced by one or more electrical components which establish the constant reference current $I_{REF}$ through pMOS transistor 72 and nMOS transistor 76.

Power supply 50 of FIGS. 5a–b represents a relatively simple, small, and inexpensive floating current power supply suitable for providing electrical power to an amplified transducer.

Instrumentation System

Figure 6:
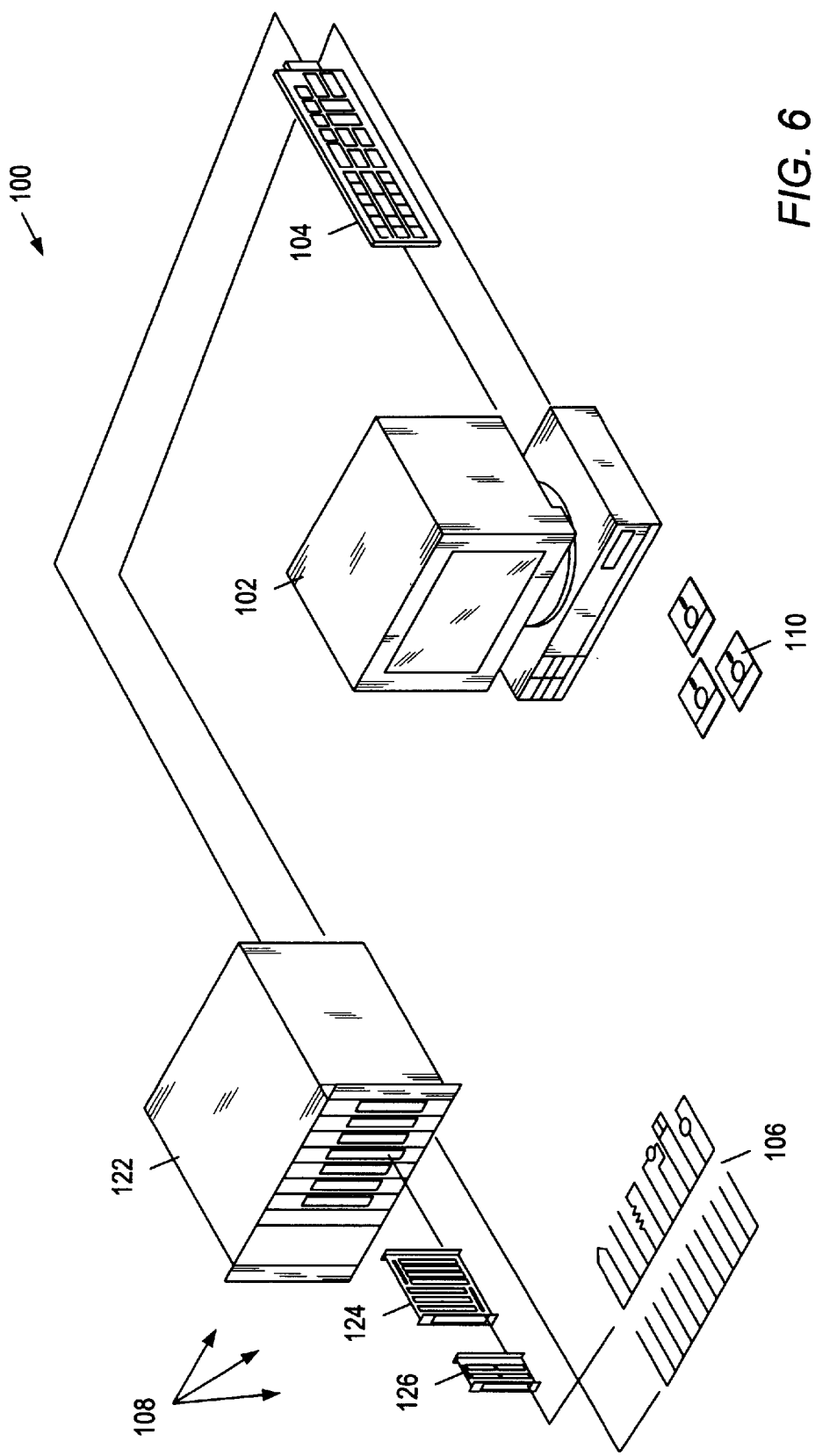
FIG. 6 is a perspective view of a computer-based instrumentation system including the power supply of FIG. 4.

FIG. 6 is a perspective view of a computer-based instrumentation system 100 including power supply 50 described above. It is noted that power supply 50 may also be comprised in any number of various systems which use power supplies. Thus FIG. 6 is illustrative only, and various other embodiments are contemplated.

Instrumentation system 100 includes a computer 102, an instrumentation device or board 104, one or more transducers 106, signal conditioning subsystem 108, and storage media 110. Signal conditioning subsystem 108 may include one or more signal conditioning modules 124 and one or more terminal blocks 126 housed within a chassis 122. Transducers 106 convert one or more measurands (e.g., force, pressure, or acceleration) to electrical measurement signals. One or more of transducers 106 may include a signal amplifier requiring an electrical bias voltage and current and/or a piezoelectric sensing element. Transducers 106 may be coupled to signal conditioning subsystem 108 by wires or cables, and may provide the measurement signals to signal conditioning subsystem 108 via the wires or cables.

Signal conditioning subsystem 108 may include at least one power supply 50 described above. For example, a power supply 50 within a signal conditioning module 124 may provide an electrical bias voltage and current required by one of the transducers 106. Signal conditioning subsystem 108 may condition (i.e., amplify, filter, perform d.c. level shifting, etc.) measurement signals received from transducers 106. Signal conditioning subsystem 108 may be coupled to computer system 102 and/or an instrumentation device or board 104 by wires or cables, and signal conditioning subsystem 108 may provide conditioned measurement data from transducers 106 to computer system 102 via the wires or cables.

Chassis 122 may be a signal conditioning extensions for instrumentation (SCXI) chassis, signal conditioning modules 124 may be SCXI signal conditioning modules, and terminal blocks 126 may be SCXI terminal blocks. SCXI is an open architecture, multi-channel signal conditioning front-end system for instrumentation devices. SCXI includes an external chassis housing signal conditioning modules for amplifying, multiplexing, and isolating measurement signals. SCXI signal conditioning modules advantageously reduce the introduction of noise into measurement signals.

Computer 102 may comprise various standard components, including at least one central processing unit (CPU), memory, a hard drive, one or more buses, and a power supply. Computer 102 may execute operating system and other software. Computer may store measurement data received from signal conditioning subsystem 108 within the memory or upon storage media 110. Storage media 110 may include, for example, magnetic floppy disks.

Instrumentation device or card 104 may be any of various types, such as a data acquisition (DAQ) device or card, a multimeter card, a voltmeter card, etc. In FIG. 6, instrumentation device or card 104 is shown external to computer system 102 for illustrative purposes. Instrument device or board 104 may be coupled to an input/output (I/O) port of computer system 102, or adapted for insertion into an expansion slot of computer system 102. Alternately, instrumentation device or board 104 may be coupled to computer 102 by a VME extensions for instrumentation (VXI) chassis and bus or a general purpose interface bus (GPIB).

Although the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A current supply, comprising:
    a current source coupled to a first terminal and to a first electrical voltage level through a first current divider, wherein the first electrical voltage level is adjustable and positive with respect to a reference potential, and wherein the current source is adapted to supply a selected amount of electrical current to the first terminal;
    a current sink coupled to the current source, to a second terminal and to a second electrical voltage level through a second current divider and, wherein the second electrical voltage level is adjustable and negative with respect to the reference potential, and wherein the current sink is adapted to receive the selected amount of electrical current from the second terminal; and
    a current regulating element coupled between the current source and the current sink, wherein the current regulating element is configured to cause a predetermined reference current to flow through both the current source and the current sink;
    wherein the selected amount of electrical current is proportional to the predetermined reference current and is determined by the first current divider and the second current divider.

2. The current supply as recited in claim 1, wherein the current source comprises a pair of semiconductor transistors coupled together such that a flow of electrical current through one of the pair of transistors produces a proportional flow of electrical current through the other transistor.

3. The current supply as recited in claim 2, wherein the semiconductor transistors are selected from the group consisting of bipolar junction transistors and metal oxide semiconductor transistors.

4. The current supply as recited in claim 1, wherein the current sink comprises a pair of semiconductor transistors coupled together such that a flow of electrical current through one of the pair of transistors produces a proportional flow of electrical current through the other transistor.

5. The current supply as recited in claim 4, wherein the semiconductor transistors are selected from the group consisting of bipolar junction transistors and metal oxide semiconductor transistors.

6. A current supply, comprising:
    a first terminal for providing a selected amount of electrical current;
    a second terminal for receiving the selected amount of electrical current;
    a current source coupled to the first terminal and to a first electrical voltage level and, wherein the first electrical voltage level is adjustable and positive with respect to a reference potential, and wherein the current source includes:
        a first pnp bipolar junction transistor having an emitter terminal, a base terminal, and a collector terminal, wherein the collector terminal of the first transistor is coupled to the first terminal, and wherein the emitter terminal of the first transistor is coupled to the first electrical voltage level through a first resistor; and
        a second pnp bipolar junction transistor having an emitter terminal, a base terminal, and a collector terminal, wherein the base terminal of the second transistor is connected to the base terminal of the first transistor, and wherein the collector terminal of the second transistor is connected to the base terminal of the second transistor such that an electrical voltage between the collector terminal and the base terminal of the second transistor is zero, and wherein
            the emitter terminal of the second transistor is coupled to the first electrical voltage level through a second resistor; and
    a current sink coupled to the second terminal and to a second electrical voltage level and, wherein the second electrical voltage level is adjustable and negative with respect to the reference potential and wherein the current sink includes:
        a third npn bipolar junction transistor having an emitter terminal, a base terminal, and a collector terminal, wherein the collector terminal of the third transistor is coupled to the second terminal, and wherein during operation the emitter terminal of the third transistor is coupled to the second electrical voltage level through a third resistor; and
        a fourth npn bipolar junction transistor having an emitter terminal, a base terminal, and a collector terminal, wherein the base terminal of the fourth transistor is connected to the base terminal of the third transistor, and wherein the collector terminal of the fourth transistor is connected to the base terminal of the fourth transistor such that an electrical voltage between the collector terminal and the base terminal of the fourth transistor is zero, and wherein during operation the emitter terminal of the fourth transistor is coupled to the second electrical voltage level through a fourth resistor;
    a current regulating element coupled between the current source and the current sink, wherein the current regulating element is configured to cause a predetermined reference current to flow through both the current source and the current sink;
    wherein the selected amount of electrical current is proportional to the predetermined reference current and is determined by the ratios of the resistance values of the first resistor to the second resistor and the third resistor to the fourth resistor.

7. The current supply as recited in claim 6, wherein a flow of electrical current through the third transistor is proportional to a flow of electrical current through the fourth transistor.

8. The current supply as recited in claim 6, wherein the collector terminal of the second transistor is coupled to the collector terminal of the fourth transistor, and wherein the predetermined reference current flows through the second and fourth transistors.

9. The current supply as recited in claim 8, wherein the current regulating element is coupled between the collector terminal of the second transistor and the collector terminal of the fourth transistor, wherein the current regulating element allows the predetermined reference current to pass therethrough.

10. The current supply as recited in claim 9, wherein the current regulating element comprises a constant current diode.

11. An electrical power supply, comprising:
    a first voltage source producing a first electrical voltage level which is positive with respect to a reference potential;
    a second voltage source producing a second electrical voltage level which is negative with respect to the reference potential; and
    a current supply, comprising:
        a current source coupled to the first electrical voltage level through a first current divider and to a first terminal, wherein the current source is adapted to supply a selected amount of electrical current to the first terminal; and
        a current sink coupled to the second electrical voltage level through a second current divider and to a second terminal, wherein the current sink is adapted to receive the selected amount of electrical current from the second terminal; and
        a current regulating element coupled between the current source and the current sink, wherein the current regulating element is configured to cause a predetermined reference current to flow through both the current source and the current sink;
        wherein the selected amount of electrical current is proportional to the predetermined reference current and is determined by the first current divider and the second current divider.

12. The electrical power supply as recited in claim 11, wherein the current source comprises a pair of semiconductor transistors coupled together such that a flow of electrical current through one of the pair of transistors produces a proportional flow of electrical current through the other transistor.

13. The electrical power supply as recited in claim 11, wherein the current sink comprises a pair of semiconductor transistors coupled together such that a flow of electrical current through one of the pair of transistors produces a proportional flow of electrical current through the other transistor.

14. The electrical power supply as recited in claim 11, wherein the first and second voltage sources are variable, and wherein during operation the first and second electrical voltage levels are adjusted by varying the first and second voltage sources such that a selected electrical voltage exists between the first and second terminals.

15. An electrical power supply, comprising:
    a first terminal for providing a selected amount of electrical current;
    a second terminal for receiving the selected amount of electrical current;
    a first voltage source producing a first electrical voltage level which is positive with respect to a reference potential;
    a second voltage source producing a second electrical voltage level which is negative with respect to the reference potential;
    a current source coupled between the first electrical voltage level and the first terminal, wherein the current source comprises:
        a first pnp bipolar junction transistor having an emitter terminal, a base terminal, and a collector terminal, and wherein the emitter terminal of the first transistor is coupled to the first electrical voltage level through a first resistor, and wherein the collector terminal of the first transistor is coupled to the first terminal; and
        a second pnp bipolar junction transistor having an emitter terminal, a base terminal, and a collector terminal, and wherein the emitter terminal of the second transistor is coupled to the first electrical voltage level through a second resistor, and wherein the base terminal of the second transistor is connected to the base terminal of the first transistor, and wherein the collector terminal of the second transistor is coupled to the base terminal of the second transistor such that an electrical voltage between the collector terminal and the base terminal of the second transistor is zero; and
    a current sink coupled between the second electrical voltage level and the second terminal, wherein the current sink comprises:
        a third npn bipolar junction transistor having an emitter terminal, a base terminal, and a collector terminal, and wherein the emitter terminal of the third transistor is coupled to the second electrical voltage level through a third resistor, and wherein the collector terminal of the third transistor is coupled to the second terminal; and
        a fourth npn bipolar junction transistor having an emitter terminal, a base terminal, and a collector terminal, and wherein the emitter terminal of the fourth transistor is coupled to the second electrical voltage level through a fourth resistor, and wherein the base terminal of the fourth transistor is connected to the base terminal of the third transistor, and wherein the collector terminal of the fourth transistor is connected to the base terminal of the fourth transistor such that an electrical voltage between the collector terminal and the base terminal of the fourth transistor is zero,
    a current regulating element coupled between the current source and the current sink, wherein the current regulating element is configured to cause a predetermined reference current to flow through both the current source and the current sink;
    wherein the selected amount of electrical current is proportional to the predetermined reference current and is determined by the ratios of the resistance values of the first resistor to the second resistor and the third resistor to the fourth resistor.

16. The electrical power supply as recited in claim 15, wherein a flow of electrical current through the first transistor is proportional to a flow of electrical current through the second transistor.

17. The electrical power supply as recited in claim 15, wherein a flow of electrical current through the third transistor is proportional to a flow of electrical current through the fourth transistor.

18. The electrical power supply as recited in claim 15, wherein the collector terminal of the second transistor is coupled to the collector terminal of the fourth transistor, and wherein the predetermined reference current flows through the second and fourth transistors.

19. The electrical power supply as recited in claim 18, wherein the current regulating element is coupled between the collector terminal of the second transistor and the collector terminal of the fourth transistor, wherein the current regulating element allows the reference current to pass therethrough.

20. The electrical power supply as recited in claim 19, wherein the current regulating element comprises a constant current diode.

21. The electrical power supply as recited in claim 15, wherein the first and second voltage sources are variable, and wherein during operation the first and second electrical voltage levels are adjusted by varying the first and second voltage sources such that a selected electrical voltage exists between the first and second terminals.

22. An instrumentation system, comprising:
 a signal conditioning subsystem adapted for coupling to a transducer, wherein the signal conditioning subsystem includes:
  an electrical power supply, comprising:
   a first voltage source producing a first electrical voltage level which is positive with respect to a reference potential;
   a second voltage source producing a second electrical voltage level which is negative with respect to the reference potential; and
   a current supply, comprising:
    a current source coupled to the first electrical voltage level through a first current divider and to a first terminal, wherein the current source is adapted to supply a selected amount of electrical current to the first terminal; and
    a current sink coupled to the second electrical voltage level through a second current divider and to a second terminal, wherein the current sink is adapted to receive the selected amount of electrical current from the second terminal; and
    a current regulating element coupled between the current source and the current sink, wherein the current regulating element is configured to cause a predetermined reference current to flow through both the current source and the current sink;
   wherein the selected amount of electrical current is proportional to the predetermined reference current and is determined by the first current divider and the second current divider.

23. The instrumentation system as recited in claim 22, wherein the transducer comprises a signal amplifier requiring an electrical bias voltage and an electrical bias current.

24. The instrumentation system as recited in claim 22, further comprising a computer coupled to the signal conditioning subsystem, wherein the computer system is configured to receive measurement data from the signal conditioning subsystem and to store the measurement data.

* * * * *

UNITED STATES PATENT AND TRADEMARK OFFICE
CERTIFICATE OF CORRECTION

PATENT NO. : 6,232,831 B1
DATED : May 15, 2001
INVENTOR(S) : Lennous et al.

Page 1 of 1

It is certified that error appears in the above-identified patent and that said Letters Patent is hereby corrected as shown below:

Column 9, claim 1,
Line 28, after the word "and" please insert -- having a first current divider coupled --.
Line 29, please delete "through a first current divider".
Line 36, after the word "and" please insert -- having a second current divider couped --.
Line 37, please delete "through a second current divider".

Column 10, claim 6,
Line 50, please delete "during operation".

Column 13, claim 22,
Line 30, after the word "coupled" please insert -- to a first terminal and having a first current divider coupled --.
Line 31, please delete "through a first current divider and to a first terminal".

Column 14, claim 22,
Line 1, please delete "through a first current divider and to a first terminal".
Line 4, after the word "coupled" please insert -- to a second terminal and having a second current divider coupled --.
Lines 5 and 6, please delete "through a second current divider and to a second terminal".

Signed and Sealed this

Twenty-fifth Day of December, 2001

Attest:

Attesting Officer

JAMES E. ROGAN
Director of the United States Patent and Trademark Office